US007742029B2

(12) United States Patent
Jung et al.

(10) Patent No.: US 7,742,029 B2
(45) Date of Patent: Jun. 22, 2010

(54) DISPLAY DEVICE AND CONTROL METHOD THEREOF

(75) Inventors: Kwang-chui Jung, Gyeonggi-do (KR); Joon-chul Goh, Seoul (KR); Young-soo Yun, Gyeonggi-do (KR); Beohm-rock Choi, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 793 days.

(21) Appl. No.: 11/483,748

(22) Filed: Jul. 7, 2006

(65) Prior Publication Data

US 2007/0164937 A1 Jul. 19, 2007

(30) Foreign Application Priority Data

Jul. 8, 2005 (KR) ...................... 10-2005-0061577

(51) Int. Cl.
*G09G 3/36* (2006.01)
*G02F 1/1333* (2006.01)

(52) U.S. Cl. .......................................... 345/92; 349/42

(58) Field of Classification Search ........... 345/30–111; 349/42–49

See application file for complete search history.

(56) References Cited

U.S. PATENT DOCUMENTS 5,285,150 A * 2/1994 Henley et al. ............... 324/770
7,245,277 B2 * 7/2007 Ishizuka ...................... 345/78
2005/0116657 A1 6/2005 Park et al.

FOREIGN PATENT DOCUMENTS

| | | |
|---|---|---|
| CN | 1495692 | 5/2004 |
| JP | 2003-43998 | 2/2003 |
| JP | 2003173172 | 6/2003 |
| JP | 2004-4673 | 1/2004 |
| JP | 2005-91443 | 4/2005 |

OTHER PUBLICATIONS

English Language Abstract, JP Patent First Publication No. 2003-043998, Feb. 14, 2003, 1 page.
English Language Abstract, JP Patent First Publication No. 2004-004673, Jan. 8, 2004, 1 page.
English Language Abstract, JP Patent First Publication No. 2005-091443, Apr. 7, 2005, 1 page.

* cited by examiner

*Primary Examiner*—Srilakshmi K Kumar
(74) *Attorney, Agent, or Firm*—Innovation Counsel LLP

(57) ABSTRACT

A display device with improved brightness and a method of controlling the display device are presented. The display device includes a driving transistor, a pixel electrode electrically connected to the driving transistor, a detecting transistor detecting a magnitude of an electric signal transferred from the driving transistor to the pixel electrode, and a controller. The controller regulates a data voltage applied to the pixel electrode based on a difference between the detected electric signal and a predetermined reference level. The display device achieves improved homogeneity of brightness by compensating for any deterioration of TFTs.

14 Claims, 6 Drawing Sheets

FIG. 3

| V data | REFERENCE LEVEL(A) |
|---|---|
| 0 | $1.76 \times 10^{-10}$ |
| 1 | $1.24 \times 10^{-9}$ |
| 2 | $8.19 \times 10^{-9}$ |
| 3 | $4.88 \times 10^{-8}$ |
| 4 | $1.91 \times 10^{-7}$ |
| 5 | $4.38 \times 10^{-7}$ |
| 6 | $7.57 \times 10^{-7}$ |
| 7 | $1.15 \times 10^{-6}$ |
| 8 | $1.67 \times 10^{-6}$ |
| 9 | $2.34 \times 10^{-6}$ |
| 10 | $3.15 \times 10^{-6}$ |

DISPLAY DEVICE AND CONTROL METHOD THEREOF

CROSS-REFERENCE TO RELATED APPLICATIONS

This application claims the benefit of Korean Patent Application No. 2005-0061577 filed on Jul. 8, 2005 in the Korean Intellectual Property Office, the disclosure of which is incorporated herein by reference.

BACKGROUND OF THE INVENTION

1. Field of the Invention

The present invention relates to a display device and a method of controlling the display device, and more particularly to a display device and a control method that is capable of reducing the deterioration of a thin film transistor.

2. Description of the Related Art

Recently, organic light emitting diodes (OLEDs) have become popular among flat panel displays. The popularity of OLEDs is at least partly due to characteristics such as low-voltage driving, light weight, slim shape, wide angle view and high-speed response. In the OLED substrate are formed a plurality of thin film transistors (TFTs) to drive the OLED, an anode electrode forming a pixel on the TFT, and a cathode electrode that generates a reference voltage. A Voltage is applied across both of the electrodes so that holes and electrons are coupled to generate excitons. Such excitons emit light while the excitons are transferred to a ground state. The light emission occurs in an emitting layer between the electrodes where the holes and the electrons combine. The OLED displays an image by adjusting the light emission.

In general, the plurality of TFTs are formed on the OLED substrate. Each pixel is provided with a switching transistor connected to a data line and a driving transistor connected to a driving voltage line.

The TFTs of the OLED progressively deteriorate with driving time. This deterioration can result in a serious problem of a predetermined voltage not being applied to the pixel electrode. Particularly, the higher the data voltage, the higher is the driving voltage. Thus, the voltage that is actually applied may be different from the "normal voltage" that should be applied to the pixel electrode. Also, the amount of a voltage or current applied to the pixel electrode may deviate from the normal range due to the deterioration of the light emitting layer made of organic materials. Due to these deteriorations of the TFTs and/or the light emitting layer, the brightness of a display device may be non-uniform and may decrease with time. It is desirable to prevent such adverse effects on the brightness of a display device.

SUMMARY OF THE INVENTION

Accordingly, it is an aspect of the present invention to provide a display device having a homogeneous brightness and a method of controlling the display device by compensating for any deterioration of TFTs.

Additional aspects and/or advantages of the present invention will be set forth in part in the description which follows and, in part, will be apparent from the description, or may be learned by practice of the present invention.

In one aspect, the invention is a display device that includes: a driving transistor, a pixel electrode electrically connected to the driving transistor, a detecting transistor detecting a magnitude of an electric signal transferred from the driving transistor to the pixel electrode, and a controller.

The controller regulates a data voltage applied to the pixel electrode based on a difference between the detected electric signal and a predetermined reference level.

In another aspect, the present invention includes a pixel electrode, a detecting transistor detecting a pixel current applied to the pixel electrode, and a controller regulating a pixel voltage applied to the pixel electrode based on a difference between the pixel current and a predetermined reference level.

In yet another aspect, the invention is a method of controlling a display device. The method entails turning on a driving transistor, detecting an electric signal transmitted from the driving transistor to the pixel electrode, comparing the detected electric signal with a predetermined reference level, and regulating a data voltage applied to the pixel electrode based on the difference between the electric signal and the predetermined reference level.

BRIEF DESCRIPTION OF THE DRAWINGS

The above and/or other aspects and advantages of the present invention will become apparent and more readily appreciated from the following description of the embodiments, taken in conjunction with the accompany drawings of which:

FIG. 3 is a reference table according to a first embodiment of the present invention;

DETAILED DESCRIPTION OF PREFERRED EMBODIMENTS

Figure 1:
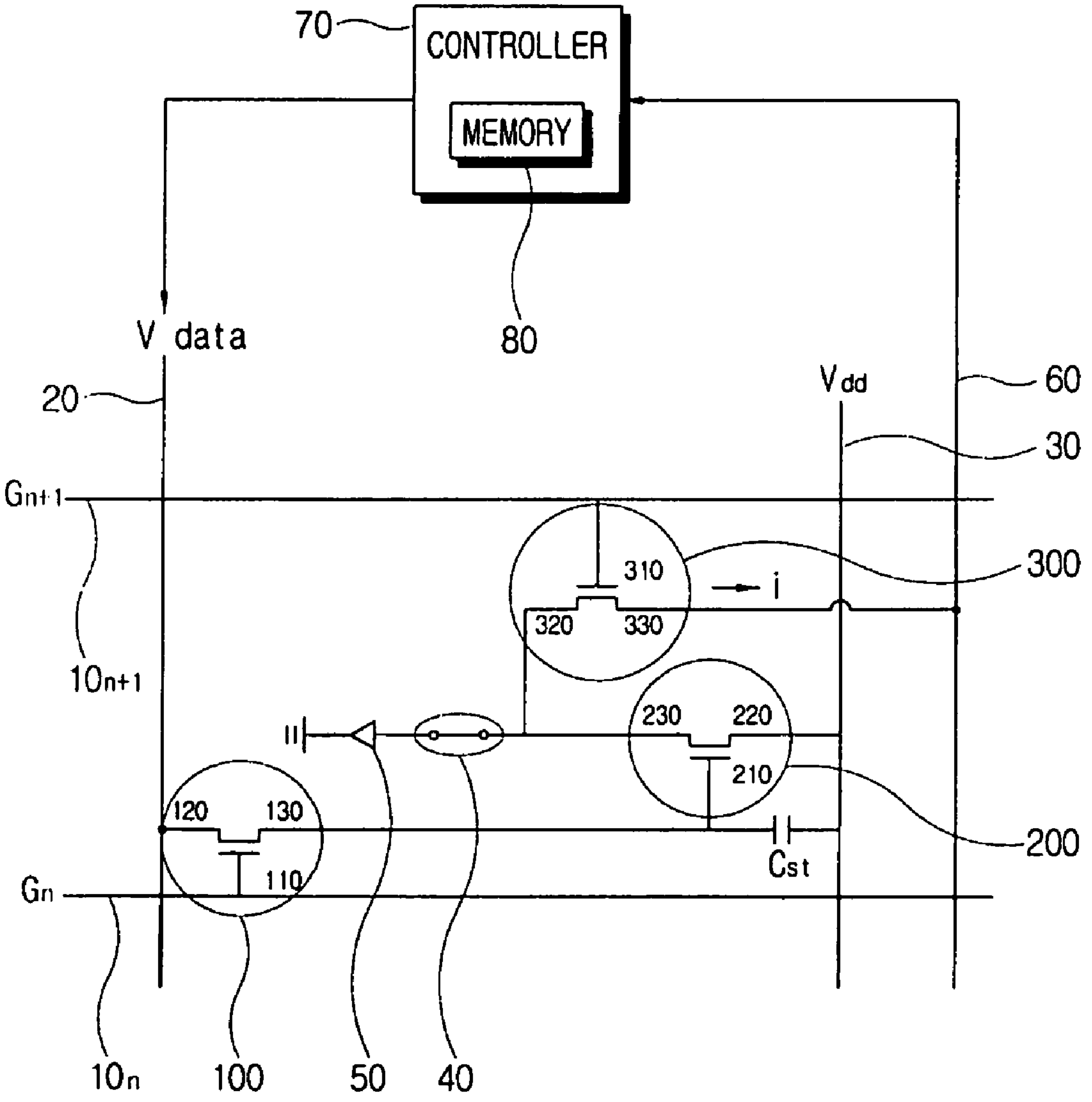
FIG. 1 is a schematic view showing a display device according to a first embodiment of the present invention.

Reference will now be made in detail to the embodiments of the present invention, examples of which are illustrated in the accompanying drawings, wherein like reference numerals refer to like elements. The embodiments are described below in order to explain the present invention by referring to the figures.

FIG. 1 is a schematic view showing a display device according to a first embodiment of the present invention, more particularly to an equivalent circuit for a pixel provided in the display device. The display device according to the present invention is explained below in the context of an OLED. However, this is just an exemplary embodiment and the invention is not limited to being used with an OLED. The invention is useful especially where a plurality of TFTs are provided to drive the display device and their deterioration has lowered the brightness level.

As illustrated, the display device includes transistors, signal lines that are connected to the transistors, and a controller 70 controlling the transistors. The "signal lines," as used herein, include a gate line 10, a data line 20, a driving voltage line 30, and a detecting line 60. The "transistors" include a switching transistor 100, a driving transistor 200, and a detecting transistor 300.

The display device also includes a pixel electrode 40 electrically connected to a driving transistor 200, and a light emitting layer 50 emitting light according to a voltage applied by the pixel electrode 40. Although not illustrated, the display device includes a gate driver and a data driver for driving the gate line 10 and the data line 20, respectively. The gate driver and the data driver drive the gate line 10 and the data line 20 by controlling the controller 70.

A plurality of the gate lines including the gate line $\mathbf{10}_n$ and the gate line $\mathbf{10}_{n+1}$ are arranged parallel to each other, and extend substantially perpendicularly to the data line 20, the driving voltage line 30, and the detecting line 60 to define a pixel region. A gate metal layer, which includes the gate lines 10*n*, 10*n*+1 and the gate electrodes 110, 210, 310 of each the transistors (100, 200, 300) may be single-layered or multilayered. The gate lines 10*n*, 10*n*+1 apply a gate on/off voltage to the transistors 100, 300 connected to the gate lines 10*n*, 10*n*+1.

A gate insulating layer made of silicon nitride (SiNx) covers these gate metal layers. The gate insulating layer electrically insulates the gate metal layer from a data metal layer.

The data line 20 and the data metal layer including a drain electrode 120, 220, 320 and a source electrode of each the transistors 100, 200, 300 are insulated from the gate metal layer. The data line 20 applies a data voltage to a switching transistor 100.

The driving voltage line 30 extends parallel to the data line 20, substantially perpendicularly to the gate line 10 to form pixel regions in a matrix formation. In general, the driving voltage line 30 is formed from a data metal layer like the data line 20. The driving voltage line 30 applies a driving voltage of a predetermined level to the driving transistor 200.

Each pixel region includes a driving voltage line 30. In some embodiments, multiple pixel regions may share one driving voltage line 30. In other words, the pixel regions arranged close to one particular driving voltage line 30 can be supplied with the driving voltage through the one driving voltage line 30. This shared-driving voltage line configuration simplifies the manufacturing process as the number of the lines are decreased. This configuration also improves an electro magnetic interference because the number of lines to which a voltage is applied is decreased.

The detecting line 60 extends parallel to the data line 20 and the driving voltage line 30. The detecting line 60 is not limited to being positioned as in the embodiment shown, and may extend parallel to the gate line 10 in some embodiments. The detecting line 60 may be formed in the same layer as the gate line 10. In this case, however, the detecting line 60 must be electrically separated from the gate line 10 in the region where the detecting line 60 and the gate line 10 cross each other. This electrical separation may be achieved by connecting either the gate line 10 or the detecting line 60 via a "bridge" that extends over the other line. Therefore, it is desirable for the detecting line 60 to be formed with the same layer as the data line 20 if the detecting line 60 is formed parallel to the data line 20.

The switching transistor 100 includes the gate electrode 110 forming a part of the gate line 10, a drain electrode 120 branching out of the data line 20, a source electrode 130 separated from the drain electrode 120, and a semiconductor layer (not shown) formed between the drain electrode 120 and the source electrode 130. A gate-on voltage applied to the n-th gate line 10*n* is transferred to the gate electrode 110 of the switching transistor 100. Accordingly, the data voltage applied from the data line 20 is discharged from the source electrode 130 through the drain electrode 120.

The driving transistor 200 regulates a current between the drain electrode 220 and the source electrode 230 according to the data voltage provided to the gate electrode 210. A voltage applied to the pixel electrode 40 through the source electrode 230 corresponds to a difference between the data voltage provided from the gate electrode 210 and the driving voltage provided from the drain electrode 220.

A storage capacitor Cst stores a voltage based on the difference between the data voltage and the driving voltage and maintains constantly current applied to the pixel electrode 400 for one frame.

A passivation layer (not shown) is formed between the drain electrode 220 and the pixel electrode 40. The drain electrode 220 and the pixel electrode 40 are electrically connected to each other through a contact hole (not shown) provided in the passivation layer. The pixel electrode 40 acts as an anode and provides holes to the light emitting layer 50.

The gate electrode 310 of the detecting transistor 300 is connected to the n+1-th gate line 10*n*+1. The drain electrode 320 is connected between the driving transistor 200 and the pixel electrode 40, the source electrode 330 is connected to the detecting line 60. A gate-on voltage is applied to the n-th gate line 10*n*. When a gate-off voltage is applied to the n-th gate line 10*n*, the gate-on voltage is applied to the n+1-th gate line 10*n*+1 concurrently. Therefore, all transistors connected to the n-th gate line 10*n* are all turned off, and all of transistors connected to the n+1-th gate line 10*n*+1 are turned on concurrently. With the gate voltage applied via the n+1-th gate line 10*n*+1, the gate electrode 310 of the detecting transistor 300 is turned on. With the gate electrode 310 turned on, a current applied to the pixel electrode 40 is discharged through the source electrode 330 via the drain electrode 320. The current released from the source electrode 330 is input to a controller 70 through the detecting line 60. In other words, the detecting transistor 300 enables the controller 70 to detect the magnitude of an electric signal when the electric signal is applied to the pixel electrode 40 by the switching transistor 100 and the driving transistor 200.

Figure 2A:
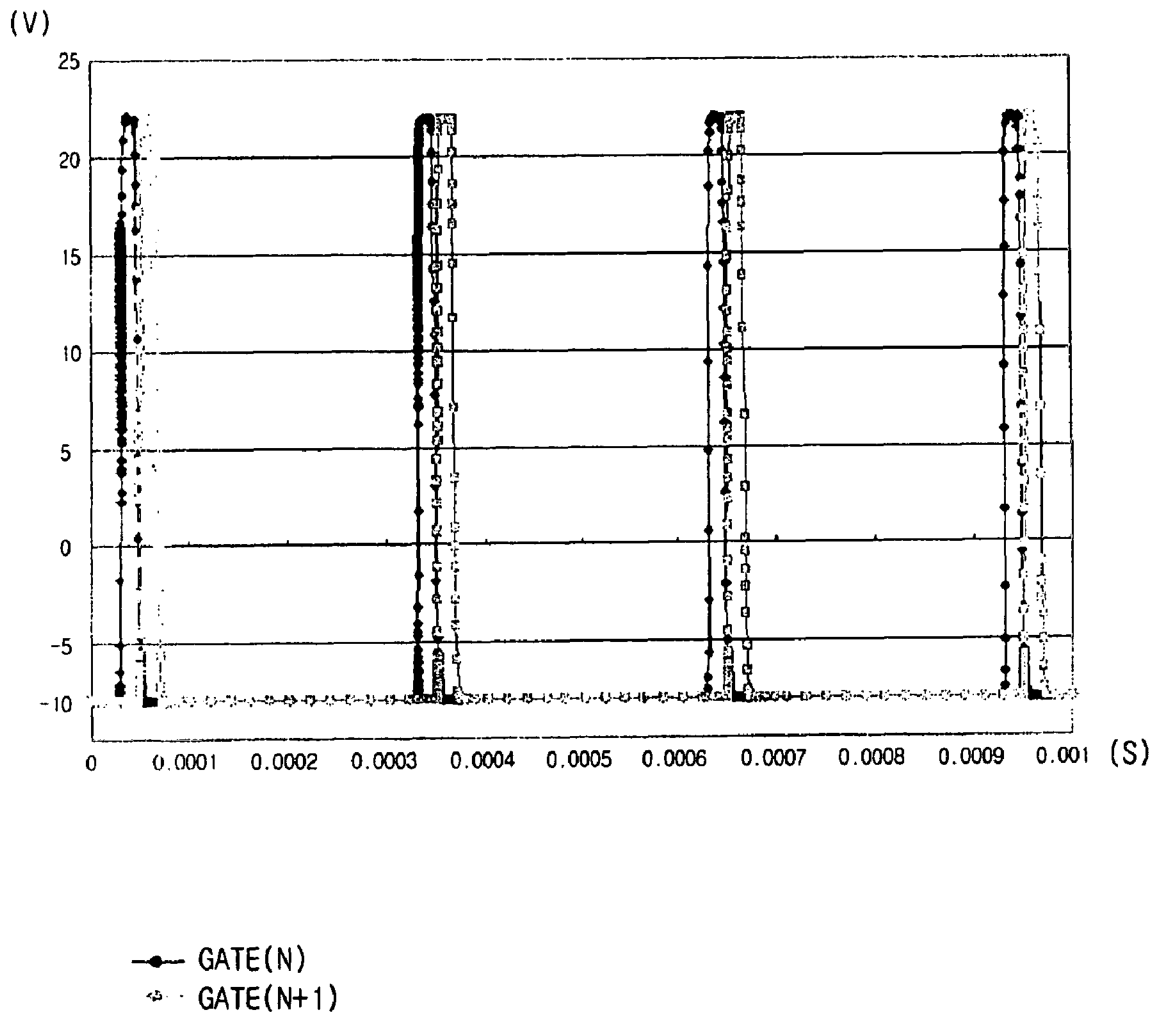
FIG. 2*a* and FIG. 2*b* are graphs showing an output of an electric signal as a function of time according to a first embodiment of the present invention.
Figure 2B:
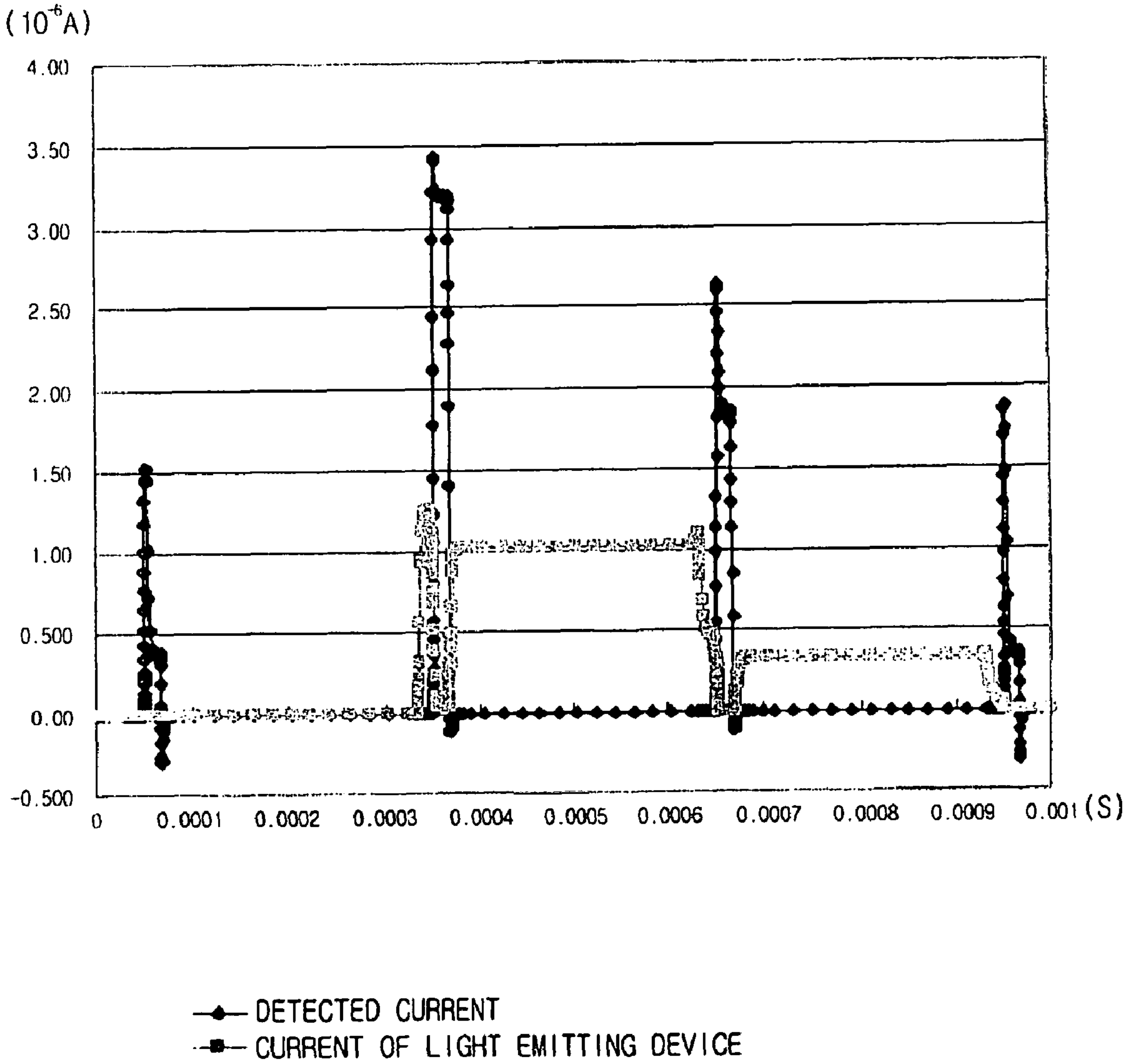

Referring to FIG. 2*a* and FIG. 2*b*, the on/off state of the detecting transistor 300 will be explained in detail as an example. In FIG. 2*a*, a gate-on voltage and a gate-off voltage which are applied to the one pixel illustrated in FIG. 1 are illustrated as a function of time. In FIG. 2*b*, the amount of a detected current is illustrated as a function of time.

In the particular embodiment that is illustrated, the gate-on voltage has a magnitude of about 20~25V and the gate-off voltage has a magnitude of about −10~−5V. If a display device is driven in 60 Hz, 60 frames are formed per second. Therefore, it takes no more than about 1/(60×the number of the gate lines) to apply the gate-on voltage. As the frequency, a resolution, and/or the number of gate lines increase, the gate-on voltage is applied for an increasingly shorter time period. The gate on voltage is applied to the pixel electrode 40 for a very short time, and the gate off voltage is applied while a frame is formed.

FIG. 2*a* illustrates an exemplary case where the gate-on voltage and the gate-off voltage are alternatingly applied four times. The gate-on voltage is applied to the n-th gate line 10*n* for about 0.00002 second, and then the gate-off voltage is applied for about 0.0003 second. The gate-off voltage is applied to the n-th gate line 10*n*. Concurrently, the gate-on voltage is applied to the n+1-th gate line 10*n*+1. When the gate-on voltage is applied to the n+1-th gate line 10*n*+1, the detecting transistor 300 is turned on. Accordingly, as illustrated in FIG. 2*b*, a current is discharged.

As illustrated in FIG. 2*b*, the current applied to the light emitting layer 50 through the pixel electrode 40 shows an abrupt decreased when the current is discharged to the detecting transistor 300. However, as shown, the current immediately returns to a normal level. The magnitude of the detected current depends on the magnitude of the data voltage, and values shown in the graph are current levels detected when the data voltages are at 5 V, 13 V, 10 V, and 15 V. The detected current is about $1.5\times10^{-6}$A when the data voltage is at 5 V, is about $3.15\times10^{-6}$A at 13 V and is about $2.6\times10^{-6}$A at 10 V. In FIG. 2*a* and FIG. 2*b*, a time interval at which the gate-on voltage and the gate-off voltage are applied, a magnitude of an applied voltage, and a level of the detected current are set up to illustrate the invention. The specific values may be changed in accordance with the particular needs of a display device.

The controller 70 compares the detected current with a predetermined current (A) that is stored in a reference level table and adequately regulates the data voltage according to the difference between the two values. The controller 70 includes a memory 80 that stores the reference level table that contains a record of the data voltage applied to the pixel electrode 40. The controller 70 regulates and corrects the data voltage on the basis of a table stored in the memory 80. In one embodiment of the present invention, the controller 70 regulates the data voltage on the basis of a magnitude of the detected current. However, the controller 70 can regulate the data voltage based on a detected voltage in some embodiments.

In FIG. 3, the reference table stored in the memory 80 is shown. In the table, a normal current corresponding to the data voltage applied through the data line 20 is listed. If the normal data voltage is applied (i.e., no deterioration of the driving transistor 200 or the light emitting layer 50), the currents detected through the detecting transistor 300 have the reference levels shown in the table. The data voltages range from, for example, 0 V to 10 V at 1-V intervals, and the reference level corresponding to each of these data voltage is calculated through a simulation. The table of FIG. 3 is a simplified version of a real table that illustrates the data voltage set up and the reference levels. In practical adoption of the display device, however, the table is likely to contain more detailed information, e.g. set up at 0.01-V or 0.001-V intervals.

Figure 4:
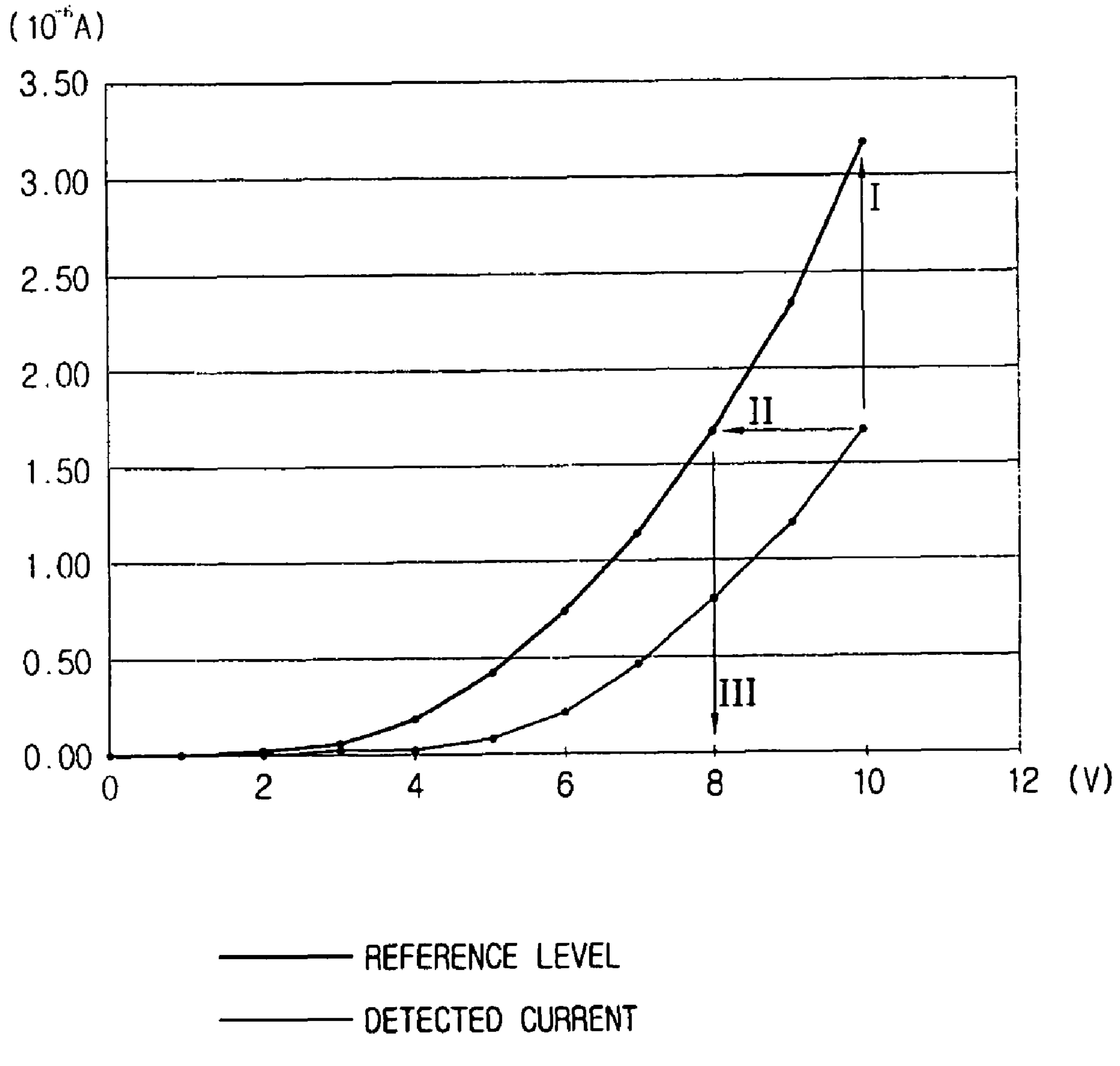
FIG. 4 is a graph showing an adjusting of data voltage of a display device according to a first embodiment of the present invention.

FIG. 4 is a graph for illustrating a data voltage control of the display device. Use of the table and the data voltage control of the controller 70 is explained in reference to FIG. 3 and FIG. 4. FIG. 4 shows a reference level corresponding to the data voltage listed in the table and a shifted current value due to the deterioration, etc. of the transistor. While the data voltage increases gradually from 0 V to 10 V, the current is measured as applied from the driving transistor 200 to the pixel electrode 40. The current value that is detected while the data voltage is between about 0 V to about 3 V closely tracks the reference level. However, as the data voltage increases over 4 V, the magnitude of the detected current becomes increasingly different from the reference level current. More particularly, as the data voltage becomes higher, the difference between the data voltage and the reference level voltage becomes larger. For example, when the data voltage is 10 V, the reference level is $3.15\times10^{-6}$A. However, the magnitude of the detected actual current is only about $1.67\times10^{-6}$A. As shown by the horizontal arrow (II), this actual current measurement corresponds to the reference level (III) at a data voltage of 8 V. In other words, although 10 V is applied to the pixel electrode 40, the effect is as though only 8 V is applied to the pixel electrode 40. Had 10 V been applied to the pixel electrode 40 without deterioration of the TFTs, the amount of detected current would have been $3.15\times10^{-6}$A (I). To compensate for this difference between the detected current and the reference level current, the controller 70 applies a compensation voltage to the data line 20. The compensation voltage corresponds to the difference between the data voltage (in this example, 8 V) that corresponds to the magnitude of the detected current (in this example, $1.67\times10^{-6}$A) and the data voltage(in this example, 10 V) that corresponds to the reference level (in this example, $3.15\times10^{-6}$A). Thus, in the example of FIG. 4, the compensation voltage is 2 V (the difference between 8 V and 10 V). With the controller 70 compensating for the data voltage, the detected current matches the reference level current that should be applied to the pixel electrode 40. The higher the data voltage, the greater is the possibility that deterioration will occur in the driving transistor 200. Accordingly, the controller 70 applies a higher voltage to the data line 20, this higher voltage being the voltage that produces the reference level current. The compensated voltage according to the above mentioned procedure is applied to the pixel electrode 40 through the data line 20 if switching transistor is turned on by the n+2-th gate line 10*n*+2.

The controller 70 includes a sensor sensing the detected signal, an operator measuring a magnitude of the sensed signal and operating the measured signal, and an output part, etc. outputting the operated compensating voltage to the data drive to apply the compensating voltage to the data line 20. This controller 70 may be programmed to achieve the calculation in any suitable way, and is not limited to the above mentioned method.

The controller 70 compensating for a data voltage according to a magnitude of the detected electric signal (i.e., the detected current), may be a timing controller provided in the display device and an additional controller that outputs a control signal through the timing controller.

Figure 5:
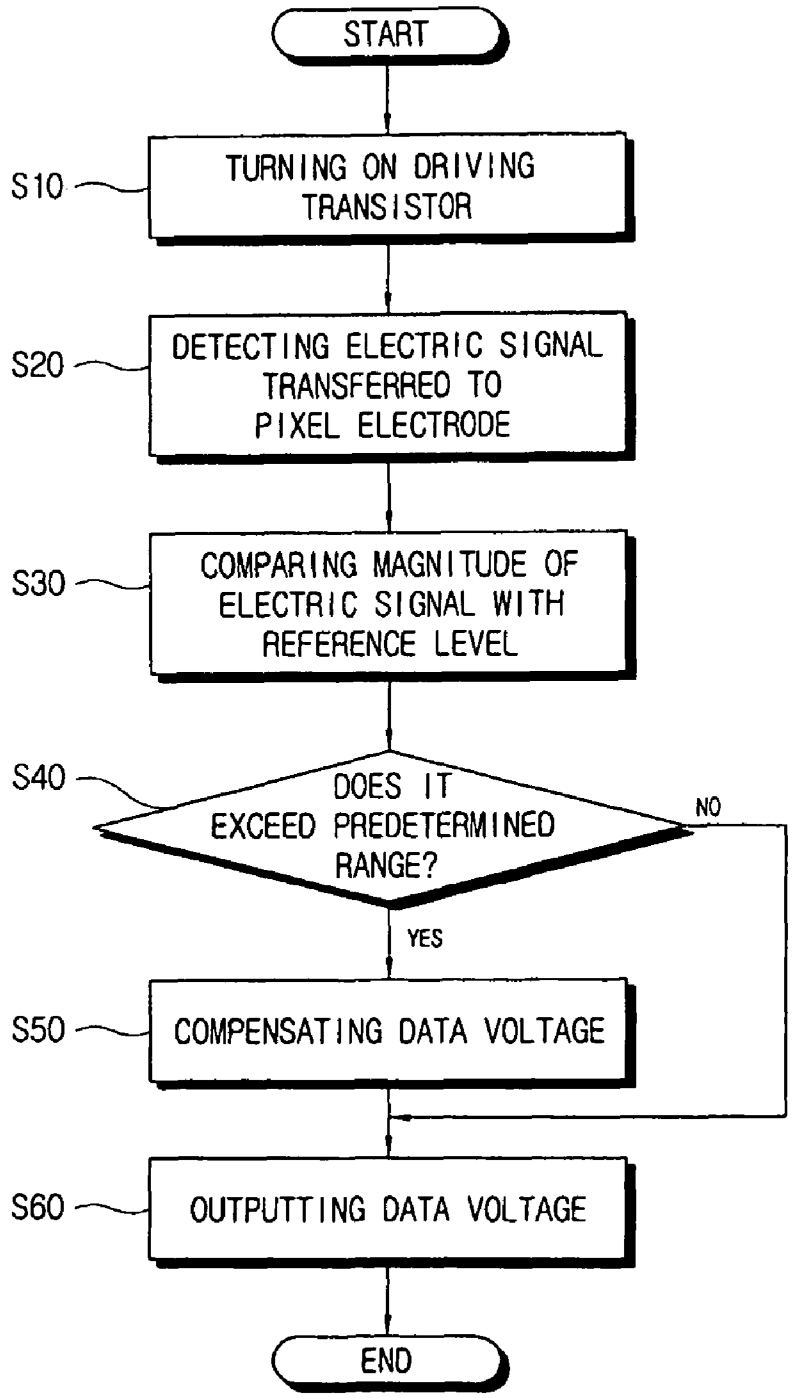
FIG. 5 is a flow chart showing a control method of a display device according to a first embodiment of the present invention.

FIG. 5 is a flow chart showing a control method of the display device according to a first embodiment of the present invention.

First, the driving transistor 200 is turned on (operation S10). The driving transistor 200 is turned on by the source electrode 130 of the switching transistor 100, and the data voltage is applied from the switching transistor 100. When the data voltage is applied to the pixel electrode 40 through the source electrode 230 of the driving transistor 200, the electric signal, namely the current that flows to the pixel electrode 40, is detected (operation S20). The controller 70 compares the magnitude of the detected current with a predetermined reference level current (operation S30), and determines whether the difference between the detected current and the reference level current exceeds a predetermined range (operation S40). The predetermined range may comprise an error range in which the detected electric signal is substantially same as the predetermined reference level. The predetermined range is intended to mean a set-up range where the compensation of the data voltage by the controller 70 is needed. The predetermined range is determined according to the nature of the transistor used in the display device and/or its degree of deterioration. If the difference between the magnitude of the detected current and the predetermined reference level current is not outside the predetermined range, the data voltage is applied with a normal voltage that was to be originally applied under the assumption of no deterioration (operation S60). On the other hand, if the difference is outside the predetermined range, the controller 70 compensates for the lowered effective data voltage by supplementing it with the difference between the data voltage corresponding to the detected electric signal and the data voltage corresponding the reference level current (operation S50). The compensated data voltage is finally applied to the pixel electrode 40 through the data line 20.

Although some embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display device comprising:
- a driving transistor;
- a driving voltage line applying a driving voltage to the driving transistor;
- a switching transistor connected to a gate electrode of the driving transistor;
- a data line applying a data voltage to the switching transistor;
- a first gate line applying a gate on voltage to the switching transistor;
- a pixel electrode electrically connected to the driving transistor;
- a detecting transistor detecting a magnitude of an electric signal transferred from the driving transistor to the pixel electrode; and
- a controller regulating a voltage applied to the pixel electrode based on a difference between the detected electric signal and a predetermined reference level;
- wherein a gate electrode of the detecting transistor is connected to a second gate line that is different from the first gate line.

2. The display device according to claim 1, further comprising a detecting line connected to the detecting transistor.

3. The display device according to claim 2, wherein the detecting line extends substantially parallel to one of the driving voltage line and the data line.

4. The display device according to claim 1, wherein the controller comprises a memory storing a table of reference levels that correspond to a range of voltages including the data voltage, and wherein the controller determines a compensation voltage based on a difference between the data voltage that corresponds to a magnitude of the detected electrical signal and a voltage corresponding to the reference level.

5. The display device according to claim 4, wherein the controller applies the compensation voltage to the data line.

6. The display device according to claim 4, wherein the controller determines the compensation voltage if the difference is outside a predetermined range of values.

7. The display device according to claim 1, wherein the electric signal is a measurement of either a voltage or a current.

8. The display device according to claim 1, wherein the predetermined range comprises an error range in which the detected electric signal is substantially same as the predetermined reference level.

9. A display device comprising:
- a pixel electrode;
- a detecting transistor detecting a pixel current applied to the pixel electrode; and
- a controller regulating a pixel voltage applied to the pixel electrode based on a difference between the pixel current and a predetermined reference level:
- wherein the controller comprises a memory storing a table of reference levels including a reference level that corresponds to the pixel current; and
- wherein the controller determines a compensation voltage based on a difference between a pixel voltage corresponding to a magnitude of the detected pixel current and a pixel voltage corresponding to the reference level.

10. The display device according to claim 9, wherein the controller applies the compensation voltage to the pixel electrode.

11. The display device according to claim 9, wherein the predetermined range comprises an error range in which the detected electric signal is substantially same as the predetermined reference level.

12. A method of controlling a display device, the method comprising:
- storing, in a memory, a predetermined reference level corresponding to a data voltage;
- turning on a driving transistor;
- detecting an electric signal transmitted from the driving transistor to a pixel electrode;
- comparing the detected electric signal with the predetermined reference level; and
- regulating the data voltage applied to the pixel electrode based on a difference between the electric signal and the predetermined reference level:
- wherein regulating the data voltage comprises determining a compensation voltage corresponding to a difference between a data voltage corresponding to a magnitude of the detected electric signal and a voltage that corresponds to the reference level.

13. The method according to claim 12, further comprising applying the compensation voltage to the pixel electrode.

14. The method according to claim 12, wherein the electric signal is a measurement of either a voltage or a current.

* * * * *